US008757851B1

(12) United States Patent
Clemons

(10) Patent No.: US 8,757,851 B1
(45) Date of Patent: Jun. 24, 2014

(54) LOCATION AND WEATHER INFORMATION ACTIVATED ILLUMINATION DEVICES FOR OUTBOARD MARINE MOTORS

(71) Applicant: Charles Edward Clemons, Signal Mountain, TN (US)

(72) Inventor: Charles Edward Clemons, Signal Mountain, TN (US)

( * ) Notice: Subject to any disclaimer, the term of this patent is extended or adjusted under 35 U.S.C. 154(b) by 0 days.

(21) Appl. No.: 13/786,667

(22) Filed: Mar. 6, 2013

Related U.S. Application Data

(60) Provisional application No. 61/612,508, filed on Mar. 19, 2012.

(51) Int. Cl.
*B60Q 1/02* (2006.01)
*F21V 21/22* (2006.01)

(52) U.S. Cl.
USPC ........... 362/377; 362/418; 362/527; 362/231; 362/233; 362/249.07

(58) Field of Classification Search
USPC ......... 362/477, 527, 532, 231, 485, 523, 526, 362/529, 233, 249.01, 249.07, 418, 431
See application file for complete search history.

(56) References Cited

U.S. PATENT DOCUMENTS

| | | | | |
|---|---|---|---|---|
| 160,290 | A * | 3/1875 | Trenchard | 248/404 |
| 994,499 | A * | 6/1911 | Bowen | 362/477 |
| 2,887,563 | A * | 5/1959 | Kiekhaefer | 362/253 |
| 3,064,122 | A * | 11/1962 | Reeder, Jr. | 362/477 |
| 3,502,861 | A * | 3/1970 | Evans | 362/477 |
| 3,851,166 | A * | 11/1974 | Kohler | 362/198 |
| 4,020,335 | A * | 4/1977 | Bisceglia | 362/224 |
| 5,613,886 | A * | 3/1997 | Cribbs | 440/2 |
| 6,200,009 | B1 * | 3/2001 | Schulte | 362/477 |
| 6,626,557 | B1 * | 9/2003 | Taylor | 362/235 |
| 6,821,170 | B2 | 11/2004 | Sanschagrin et al. | |
| 6,840,827 | B2 | 1/2005 | Vignau | |
| 6,948,834 | B2 * | 9/2005 | Lilly | 362/477 |
| 7,794,124 | B2 * | 9/2010 | Hulsey et al. | 362/477 |
| 7,997,764 | B1 * | 8/2011 | Nielson | 362/249.02 |
| 2007/0093151 | A1 | 4/2007 | Sanschagrin et al. | |

* cited by examiner

*Primary Examiner* — Ismael Negron
(74) *Attorney, Agent, or Firm* — Goldstein Law Offices, P.C.

(57) ABSTRACT

An illumination device includes a telescoping mast with a stern navigation light source, a first rear facing illumination source, a second rear facing illumination source, a front-facing inboard light source stationed between the first and second light sources, a weather receiver which receives location-based weather information, and a geo-location receiver in communication with the weather receiver. The mast automatically telescopes and retracts, and the stern navigation light source automatically turns on and off, based at least in part on the information. The illumination device can be provided in an outboard marine motor, or as a system for retrofitting existing outboard marine motors.

15 Claims, 11 Drawing Sheets

LOCATION AND WEATHER INFORMATION ACTIVATED ILLUMINATION DEVICES FOR OUTBOARD MARINE MOTORS

CROSS-REFERENCE TO RELATED APPLICATIONS

This application claims priority to U.S. Provisional Patent Application Ser. No. 61/612,508, filed on Mar. 19, 2012, which is herein incorporated by reference in its entirety for all purposes.

TECHNICAL FIELD

Generally, the present disclosure relates to outboard marine motors. More particularly, the present disclosure relates to systems for nighttime fishing and devices for retrofitting outboard marine motors for nighttime fishing.

BACKGROUND

In the present disclosure, where a document, an act and/or an item of knowledge is referred to and/or discussed, whether directly and/or indirectly, then this reference and/or discussion is not an admission that the document, the act and/or the item of knowledge and/or any combination thereof was at the priority date, publicly available, known to the public, part of common general knowledge and/or otherwise constitutes prior art under the applicable statutory provisions and/or is known to be relevant to an attempt to solve any problem with which the present disclosure is concerned.

Outboard marine motors come in a variety of constructions and are widely used in many marine environments. Typically, an outboard marine motor is attached to a small to a midsize boat in order to function as a propulsion and steering control system for the boat. Such motor usually includes a propulsion device, such as a propeller, a turbine or a jet propulsion unit, powered by an engine, such as an internal combustion engine.

Generally, a white stern navigation light illuminates at least an area of a stern portion of the boat. Such illumination makes the area more visible and indicates the boat's presence to other boats. Hence, for safety and ease of marine navigation, many jurisdictions require use of white stern lights during harsh weather, poor visibility and/or from about sunset to about sunrise. However, many boats having outboard motors are unable to comply with such requirements due to lack of on-board electrical systems capable of powering such lights for extended periods of time. Such non-compliance reduces safety, makes marine navigation difficult and/or exposes boat operators to risk of governmental fines and/or other penalties.

Some have attempted to commercialize on such non-compliance by introducing various cowlings specifically molded to incorporate stern lights. However, the cowling configurations are inconvenient to install and often cost-prohibitive for boat owners who would like to retrofit their current outboard motors. As a result, many boat owners, unsatisfied with such cowling configurations, resort to other measures.

One of such measures is making a hole in a hull of the boat and inserting a navigation staff with a stern light secured on its tip into the hole. However, such setup suffers from various disadvantages. For example, the presence of the hole is undesirable due to resulting modification of the hull's integrity, unaesthetic appearance and/or water leakage. Furthermore, such positioning of the staff interferes with stationing of the stern light out of the away of boat occupants, while keeping the stern light sufficiently elevated above the water to be seen by others external to the boat. Moreover, the positioning of the staff makes putting away the stern light when not in use inconvenient and/or burdensome to boat operators. Additionally, when the staff is removed from the hole, the staff occupies valuable boat space and can be broken, stepped on, lost or fallen overboard.

While certain aspects of conventional technologies have been discussed to facilitate the present disclosure, no technical aspects are disclaimed. The claims may encompass one and/or more of the conventional technical aspects discussed herein.

BRIEF SUMMARY

An example embodiment of the present disclosure includes a system for nighttime fishing. The system including an outboard marine motor including a telescoping mast, a first rear facing illumination zone and a second rear facing illumination zone. The mast including a stern navigation light source thereon. The zones are positioned to be above water level. Each of the zones is operative to selectively output at least one of a black light, a white light and a red light. The black light is sufficiently bright to illuminate overboard florescent fishing lines for nighttime visibility from inboard. The white light is sufficiently bright to illuminate overboard for nighttime visibility from inboard. The red light is sufficiently bright to indicate presence to other boats during nighttime towing. The system including a console for controlling the mast, the stern light source and illumination from the zones.

Another example embodiment of the present disclosure includes a system for retrofitting an outboard marine motor. The motor including an engine and a cowling enclosing the engine. The cowling is operative above water level. The system includes a device having a top side and a bottom side. The top side including a mast aperture. The device including a telescoping mast operative to deploy via the aperture. The mast having a top end area and a stern navigation light source stationed in the top end area. The stern light source is operative to output stern navigation light at nighttime. The bottom side including an illumination zone operative to selectively output at least one of a black light, a white light and a red light. The black light is sufficiently bright to illuminate overboard florescent fishing lines for nighttime visibility from inboard. The white light is sufficiently bright to illuminate overboard for nighttime visibility from inboard. The red light is sufficiently bright to indicate presence to other boats during nighttime towing. The device is operative to secure onto the cowling such that the mast and the stern light source operate based on power generated via the engine and illumination from the zone is based on power generated via the engine. The system including a console for controlling the mast, the stern light source and illumination from the zone.

Yet another example embodiment of the present disclosure includes a system for nighttime fishing. The system including an outboard marine motor including a telescoping mast, a first rear facing illumination pattern, a second rear facing illumination pattern and a third rear facing illumination pattern. The mast including a stern navigation light source thereon. The first pattern is operative to selectively output a red light sufficiently bright to indicate the boat's presence to others during towing at nighttime. The second pattern is operative to selectively output a white light sufficiently bright to illuminate overboard for nighttime visibility from inboard. The third pattern is operative to selectively output a black light sufficiently bright to illuminate overboard florescent fishing lines for nighttime visibility from inboard. The patterns positioned to be above water level. The system including a console for controlling the mast, the stern light source and illumination from the patterns.

The present disclosure may be embodied in the form illustrated in the accompanying drawings. Attention is called to the fact, however, that the drawings are illustrative. Variations are contemplated as being part of the disclosure, limited only by the scope of the claims.

BRIEF DESCRIPTION OF THE DRAWINGS

The accompanying drawings, which are incorporated into and form a part of the specification, illustrate example embodiments of the present disclosure. Together with the detailed description, the drawings serve to explain the principles of the present disclosure. The drawings are only for the purpose of illustrating example embodiments of the present disclosure and are not to be construed as necessarily limiting the disclosure. The above and other objects, aspects, advantages and features of the present disclosure will become better understood to one skilled in the art with regard to the following description, appended claims and accompanying drawings where:

DETAILED DESCRIPTION OF THE PREFERRED EMBODIMENTS

Figure 1:
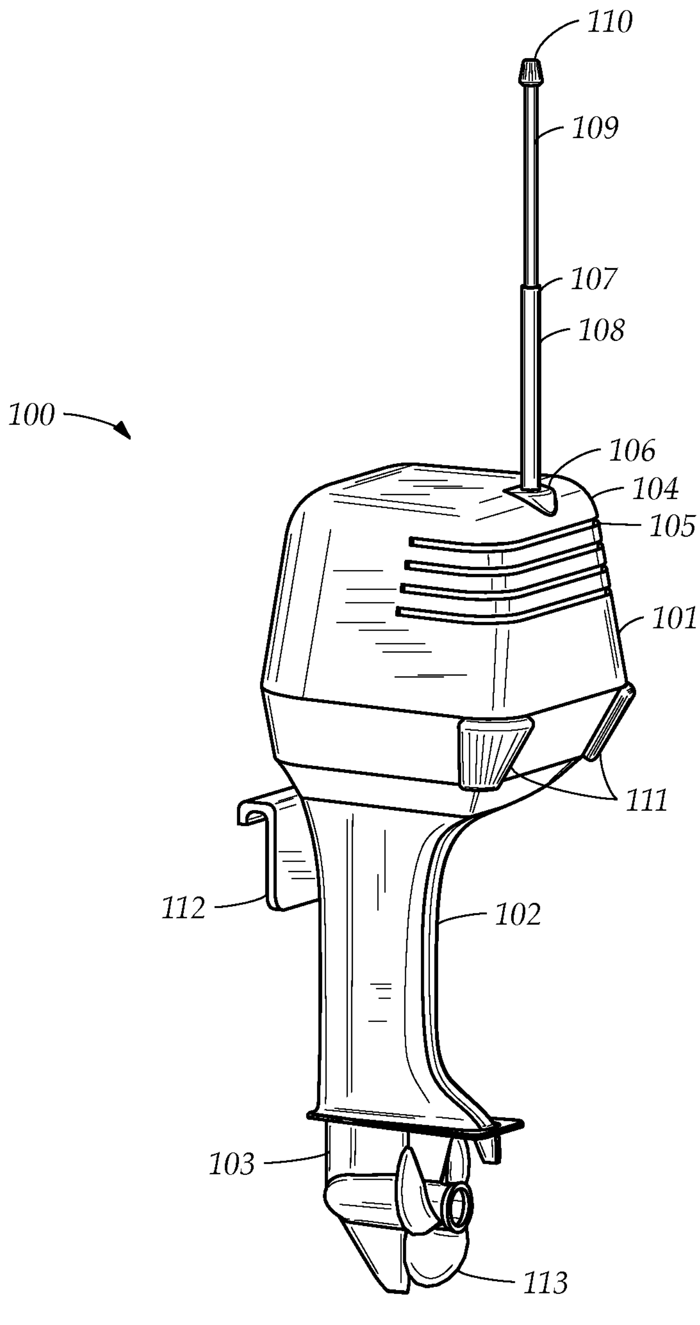
FIG. 1 shows an example embodiment of an outboard marine motor with a stern light mounted on a mast in a deployed state according to the present disclosure.

The present disclosure will now be described more fully with reference to the accompanying drawings, in which example embodiments of the disclosure are shown. The disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art. Also, features described with respect to certain embodiments may be combined in various other embodiments. Different aspects and elements of the embodiments may be combined in a similar manner.

Any verbs as used herein can imply direct or indirect, full or partial, action or inaction. For example, when an element is referred to as being "on," "connected" or "coupled" to another element, then the element can be directly connected or coupled to the other element or intervening elements may be present. In contrast, when an element is referred to as being "directly connected" or "directly coupled" to another element, there are no intervening elements present.

Although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

The terminology used herein is for the purpose of describing particular embodiments only and is not intended to be necessarily limiting of the disclosure. As used herein, the singular forms "a," "an" and "the" are intended to include the plural forms as well, unless the context clearly indicates otherwise. The terms "comprises," "includes" and/or "comprising," "including" when used in this specification, specify the presence of stated features, integers, steps, operations, elements, and/or components, but do not preclude the presence or addition of one or more other features, integers, steps, operations, elements, components, and/or groups thereof.

Example embodiments of the disclosure are described herein with reference to illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein, but are to include deviations in shapes that result, for example, from manufacturing. Any components and/or materials can be formed from a same, structurally continuous piece and/or be separately manufactured and/or connected.

Unless otherwise defined, all terms (including technical and scientific terms) used herein have the same meaning as commonly understood by one of ordinary skill in the art to which this disclosure belongs. The terms, such as those defined in commonly used dictionaries, should be interpreted as having a meaning that is consistent with their meaning in the context of the relevant art and will not be interpreted in an idealized or overly formal sense unless expressly so defined herein.

Furthermore, relative terms such as "below," "lower," "above," and "upper" may be used herein to describe one element's relationship to another element as illustrated in the accompanying drawings. Such relative terms are intended to encompass different orientations of the device in addition to the orientation depicted in the accompanying drawings. For example, if the device in the accompanying drawings is turned over, elements described as being on the "lower" side of other elements would then be oriented on "upper" sides of the other elements. Similarly, if the device in one of the figures is turned over, elements described as "below" or "beneath" other elements would then be oriented "above" the other elements. Therefore, the example terms "below" and "lower" can, therefore, encompass both an orientation of above and below.

Any and/or all elements as disclosed herein can be rigid, flexible, aligned, misaligned, symmetrical, asymmetrical, linear, non-linear, wavy, non-wavy, identical in length, width, height, depth and/or weight, non-identical in length, height, width, depth and/or weight, for single use, reusable, smooth, rough, flush, non-flush, even leveled, non-even leveled with respect to any and/or all other elements as disclosed herein and/or any combination thereof.

FIG. 1 shows an example embodiment of an outboard marine motor with a stern light mounted on a mast in a deployed state according to the present disclosure.

An outboard marine motor 100 includes an upper section 101, which can be a power-head section, a middle section 102, which can be a midsection, and a lower section 103, which can be a lower unit section. Section 102 connects section 101 to section 103.

Section 101 includes a cowling 104 having a plurality of parallel channels 105 therein. Cowling 104 can be of any shape or size. Channels 105 can be of any number. Channels 105 can be intersecting with each other. Any and/or all channels 105 can extend in any geometric shape, whether identical and/or non-identical to each other, such as a line, whether straight, zigzag, wavy or dashed, an ellipse, such as an oval or a circle, a parallelogram, a quadrilateral and others. Channels 105 can allow air flow to space enclosed by cowling 104. Any portion of section 101 can lack at least one handle, such as on to surface.

Section 101 includes an engine configured to provide sufficient power to propel a boat. Cowling 104 encloses the engine, which can be internal combustion engine or any other engine. The engine is also configured to provide sufficient power to power electrical lights and other electrical devices.

Cowling 104 includes a protrusion having an aperture 106, which leads to a sleeve within cowling 104. The sleeve is configured to store a telescoping mast 107 when mast 107 is retracted into the sleeve. Mast 107 can rotate within aperture 106 and the sleeve. Mast 107 has a tubular portion 109 concentrically nested within a tubular portion 108. Portions 108 and 109 can interlock. Portions 109 or 108 can be of any shape, such as circular or square. When mast 107 is retracted into the sleeve, portion 109 is concentrically nested within portion 108. Mast 107 can include stainless steel, plastic or any other corrosion resistant material. Mast 107 can be telescoped pneumatically or hydraulically. Mast 107 can also be telescoped via a fish tape coil or via a spring loaded within mast 107. Mast 107 can have any number of concentric telescoping tubular portions. Mast 107 can be located in any area of cowling 104.

A stern light 110 is mounted on a tip of portion 109. When mast 107 is retracted into the sleeve, light 110 can enter the sleeve or remain outside the sleeve. Light 110 can be flush with cowling 104 or non-flush with cowling 104. Light 110 can include a collar to prevent retraction into the sleeve. Light 110 can be turned on or turned off whether mast 107 is retracted or deployed. Light 110 can also be turned on upon full deployment or turned off upon full retraction. Mast 107 can extend to any height as desired and remain extended as long as desired, such as when light 110 is elevated two and half feet above cowling 104 via mast 107. Mast 107 can also be configured to extend and retract without user input as to how high mast 107 should be.

Some example embodiments can allow mast 107 with light 110 to provide compact design, lack of hull integrity modification, less interference with boat occupants, aesthetic appearance, reduced water leakage, less wind resistance when retracted, enhanced visibility when telescoped, while allowing compliance with marine navigational rules, illumination of the boat's deck, on-board electrical systems powering lights 110 for extended periods of time and/or penalty reduction for boat operators due to incompliance with marine navigation rules. Also, the positioning of mast 107 makes putting away stern light 110 when not in use convenient and/or not burdensome to boat operators. Additionally, when mast 107 allows presence of valuable boat space and mast 107 can be difficult to brake, step on, lose or fall overboard due to its position.

A power cord or a wire extending through mast 107 connects light 110 to the engine, which powers light 110. Light 110 can be of any color, such as white, green or red. Light 110 can be any type of light bulb, such as an incandescent bulb, a fluorescent bulb or a Light Emitting Diode (LED) bulb. Alternatively, mast 107 can be non-telescoping and light 110 is mounted on the tip of portion 108.

Section 101 also includes a plurality of lights 111 present in rear facing illumination zones, which positioned to be above water level. Alternatively, lights 111 can be a single light extending across. Lights 111 can be connected to and powered by the power cord or the wire as described above or be connected to another power cord or another wire connected to the engine. Lights 111 can individually or together be of any color, such as black ultraviolet (UV), white, red or green. For example, the red light can be above the white light which can be above the black light within each zone. Lights 111 can individually or together be of any type of light bulb, such as an incandescent bulb, a fluorescent bulb or a LED bulb. Light 110 and each of and/or all lights 111 can be turned on and turned off individually or together. Lights 111 can be used for fishing at night with a florescent fishing line. Wiring for light 110 and lights 111 is hidden within cowling 104. Cowling 104 can include lights 111. Lights 111 can be flush and/or non-flush with the zones, cowling 104 and/or outer wall on which cowling 104 rests on. Mast 107 is above and between the zones. An outer wall can have lights 111. The outer wall is positioned above water level and cowling 104 resting on the outer wall. Alternatively, cowling 104 can including the zones and/or lights 111.

Each of lights 111 is operative to selectively output at least one of a black light, a white light and a red light. The black UV light is sufficiently bright to illuminate overboard florescent fishing lines for nighttime visibility from inboard. The white light is sufficiently bright to illuminate overboard for nighttime visibility from inboard, such as for observing the caught fish as the fish is being reeled in. The red light is sufficiently bright to indicate presence to other boats during nighttime towing. Each of lights 111 includes a black light source, a white light source and a red light source. Within each of lights 111, the red light source is above the black light source for greater visibility to others during towing. The black light is closer to the water for enhanced florescent fishing line illumination.

Section 101, such as cowling 104, includes a front facing inboard light source operative to selectively output light sufficiently bright for illuminating inboard at nighttime, such as the boat's deck at stern area.

The zones can include non-light features and/or elements as well. The zones can be protrusions, wells and/or any other defined areas. The zones can be rear facing to be directly opposite of the boat's bow and/or the zones can be rear facing to be facing diagonally and/or vertically from the corners of the motor, if the motor has corners. The zones can extend along the corners from both sides of converging sides of the corners. The zones can also be present on one side of the corners, such as the direct opposing from the bow side or the side converging with the direct opposing from the bow side. The zones can allow for lights 111 to be enclosing by cowling 104 with cowling 104 having corresponding apertures such that lights 111 are visible through the apertures, which can be covered by a plastic or a glass strip to prevent the water from coming in contact with lights 111. Also, the zones can be over cowling 104 such that lights 111 are placed on top of cowling 104 with cowling 104 having corresponding holes for wiring from lights 111. Lights 111 can also be powered wirelessly via inductive charging.

In another example embodiment, motor 100 includes a night sensor powered by the engine. The night sensor automatically turns on light 110 or lights 111 upon detecting nighttime. For example, any element of section 101, such as cowling 104 or mast 107, can include the night sensor.

In yet another example embodiment, motor 100 includes a Global Positioning System (GPS) chip coupled to a weather receiver, which is coupled to light 110 or lights 111. The engine powers the weather receiver and the GPS chip. Upon the weather receiver detecting poor weather conditions based on its location detected via the GPS chip, the weather chip turns on light 110 or lights 111. Upon the weather receiver detecting good weather conditions based on its location detected via the GPS chip, the weather chip turns off light 110 or lights 111. For example, any element of section 101, such as cowling 104 or mast 107, can include the GPS chip or the weather receiver.

Section 102 includes a clamp 112, which is configured to secure motor 100 to a stern of a boat. Clamp 112 can include magnetic material to enhance clamping of clamp 112. Alternatively, section 102 can include metal bolts that go through the boat's transom.

Section 103 includes a propeller 113, which is powered by the engine. Light 110 and lights 111 can be turned on upon rotation of propeller 113 or turned off upon cessation of rotation of propeller 113.

Figure 2:
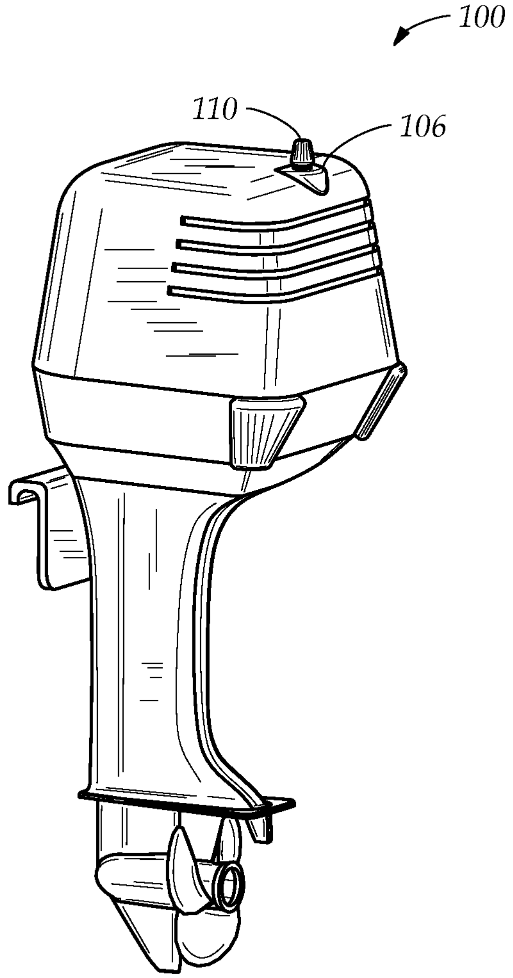
FIG. 2 shows an example embodiment of an outboard marine motor with a stern light mounted on a mast in a retracted state according to the present disclosure.

FIG. 2 shows an example embodiment of an outboard marine motor with a stern light mounted on a mast in a retracted state according to the present disclosure. Some elements of this figure are described above. Thus, same reference characters identify same or like components described above and any repetitive detailed description thereof will hereinafter be omitted or simplified in order to avoid complication.

Mast 107 is telescopically retracted into the sleeve via aperture 106. Light 110 is outside of the sleeve and thus visible to boat occupiers. Alternatively, light 110 can be retracted into the sleeve via aperture 106 and be invisible to boat occupiers.

Figure 3:
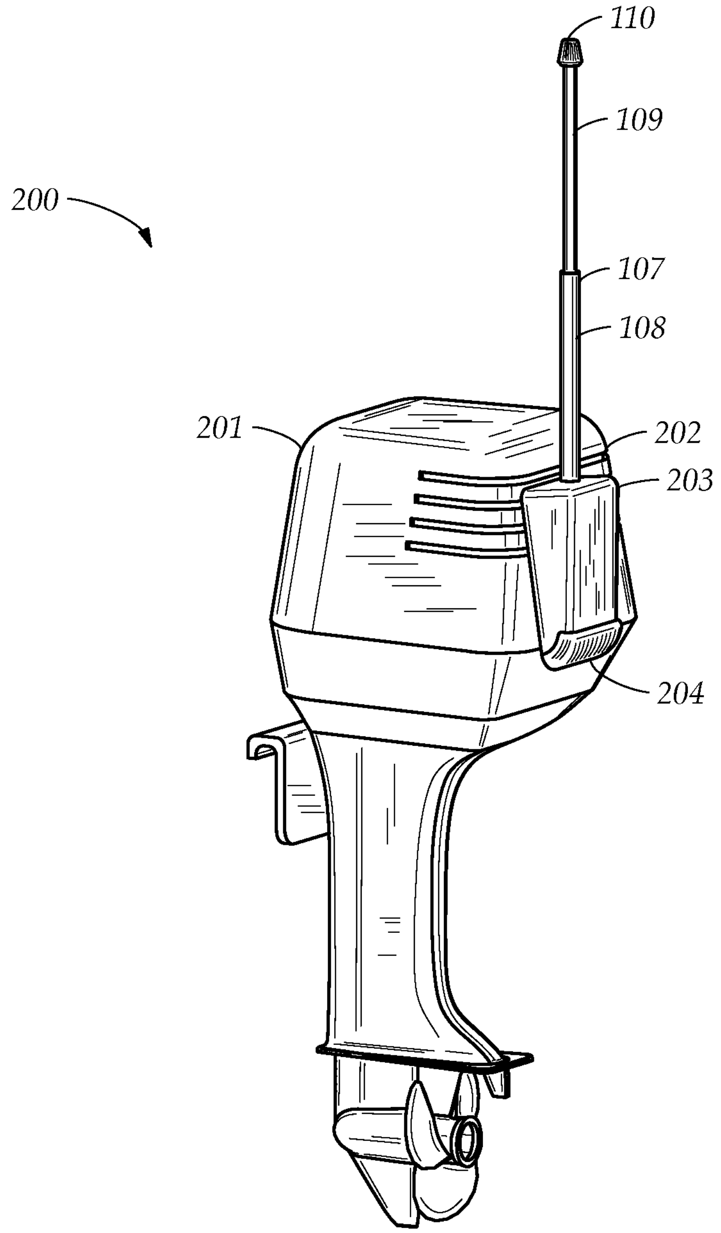
FIG. 3 shows an outboard motor with an example embodiment of a stern light device in a deployed state according to the present disclosure.

FIG. 3 shows an outboard motor with an example embodiment of a stern light device in a deployed state according to the present disclosure. Some elements of this figure are described above. Thus, same reference characters identify same or like components described above and any repetitive detailed description thereof will hereinafter be omitted or simplified in order to avoid complication.

An outboard marine motor 200 includes a cowling 201 having a plurality of parallel channels 202 therein. Cowling 201 can be similar and/or identical to cowling 104. Channels 202 can be similar and/or identical to channels 105. Cowling 201 can be of any shape or size. Channels 202 can be of any number. Channels 202 can be intersecting with each other. Cowling 201 encloses an engine, which can be internal combustion engine or any other engine configured to propel a boat and to provide sufficient power to power electrical lights and other electrical devices.

A stern light device is attached to cowling 201. The device includes a housing 203 having a light 204 at its base and mast 107 with light 110. Housing 203 can be of any sufficient size or shape configured to attach to motor 200. Housing 203 can include a magnetic material or stainless steel or plastic or other corrosion resistant material. Housing 203 can also include heat resistant materials operative to tolerate at least exhaust heat. Housing 203 includes a sleeve, which can be similar and/or identical to the sleeve described above, for storing mast 107, as described above. Light 204 can be similar and/or identical to lights 111. Mast 107 retracts into and deploys from housing 203 in a similar and/or identical manner as described above. Light 110 is operated in a similar and/or identical manner as described above.

Light 204 can be a plurality of lights or a single light extending across. Light 204 can be connected to and powered by the power cord or the wire as described above or be connected to another power cord or another wire connected to the engine. Lights 204 can individually or together be of any color, such as black ultraviolet (UV), white, red or green. For example, the red light can be above the white light which can be above the black light within the zone. Light 204 can individually or together be of any type of light bulb, such as an incandescent bulb, a fluorescent bulb or a LED bulb. Light 204 can be used for fishing at night with a florescent fishing line. Wiring for light 204 is hidden within housing 203. The zone can include non-light features and/or elements as well. The zone can be protrusions, a well and/or any other defined area. The zone can be rear facing to be directly opposite of the boat's bow and/or the zone can be rear facing to be facing diagonally and/or vertically from the corners of housing 204, if housing 204 has corners. The zone can extend along the corners from both sides of converging sides of the corners of housing 204. The zone can also be present on one side of the corners, such as the direct opposing from the bow side or the side converging with the direct opposing from the bow side. The zone can allow for lights 204 to be enclosing by housing 203 with housing 203 having corresponding aperture such that light 204 is visible through the aperture, which can be covered by a plastic or a glass strip to prevent the water from coming in contact with light 204. Also, the zone can be over housing 203 such that light 204 is placed on top of housing 203 with housing 203 having corresponding holes for wiring from light 204. Light 204 can also be powered wirelessly via inductive charging.

Housing 203 can include easily accessible electrical wiring configured for coupling to an electrical wiring harness associated with motor 200 such that lights 110 and 204 are powered via motor 200 and means for telescoping mast 107, such as pneumatic or hydraulic mechanism, receive power. Such wiring can include a male/female connector.

Cowling 201 can include a means for attaching to housing 203, such as an adhesive, a clamp, a pin, a fastener, a rivet, a male/female connector, a snap, a button, a belt, a hook or a protrusion, configured for secure attachment of cowling 201 to the stern light device.

Housing 203 can include a means for attaching to cowling 201, such as an adhesive, a clamp, a pin, a fastener, a rivet, a male/female connector, a snap, a button, a belt or one or more hooks or protrusions, configured to correspond to one or more channels 202 for secure attachment of housing 203 to cowling 201.

In another example embodiment, housing 203 includes a battery for providing power to lights 110 and 204 and for means for telescoping mast 107.

In yet another example embodiment, the device includes a night sensor. The night sensor automatically turns on lights 110 or 204 upon detecting nighttime. The night sensor can be powered via a battery within housing 203 or via motor 200. Housing 203 or mast 107 can include the night sensor.

In yet even another example embodiment, the device includes a GPS chip coupled to a weather receiver, which is coupled to lights 110 or 204. The weather receiver and the GPS chip are powered by a battery within housing 203 or via motor 200. Upon the weather receiver detecting poor weather conditions based on its location detected via the GPS chip, the weather chip turns on lights 110 or 204. Upon the weather receiver detecting good weather conditions based on its location detected via the GPS chip, the weather chip turns off lights 110 or 204. Housing 203 or mast 107 can include the GPS chip or the weather receiver.

Figure 4:
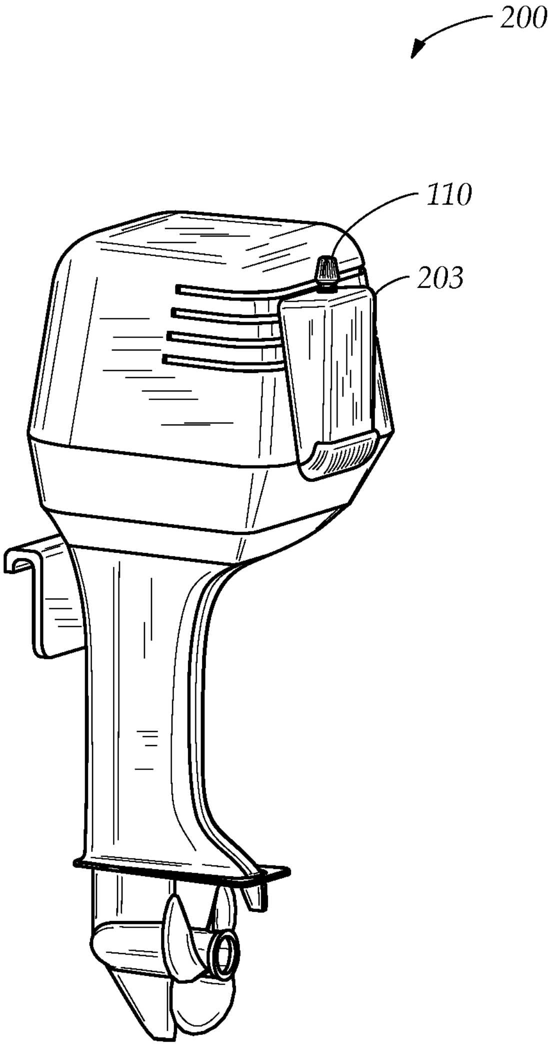
FIG. 4 shows an outboard motor with an example embodiment of a stern light device in a retracted state according to the present disclosure.

FIG. 4 shows an outboard motor with an example embodiment of a stern light device in a retracted state according to the present disclosure. Some elements of this figure are described above. Thus, same reference characters identify same or like components described above and any repetitive detailed description thereof will hereinafter be omitted or simplified in order to avoid complication.

Mast 107 is telescopically retracted into housing 203 of the stern light device. Light 110 is outside of the sleeve and thus visible to boat occupiers. Alternatively, light 110 can be retracted into the sleeve and be invisible to boat occupiers. Light 110 can be flush with housing 203 or be non-flush with housing 203.

Figure 5:
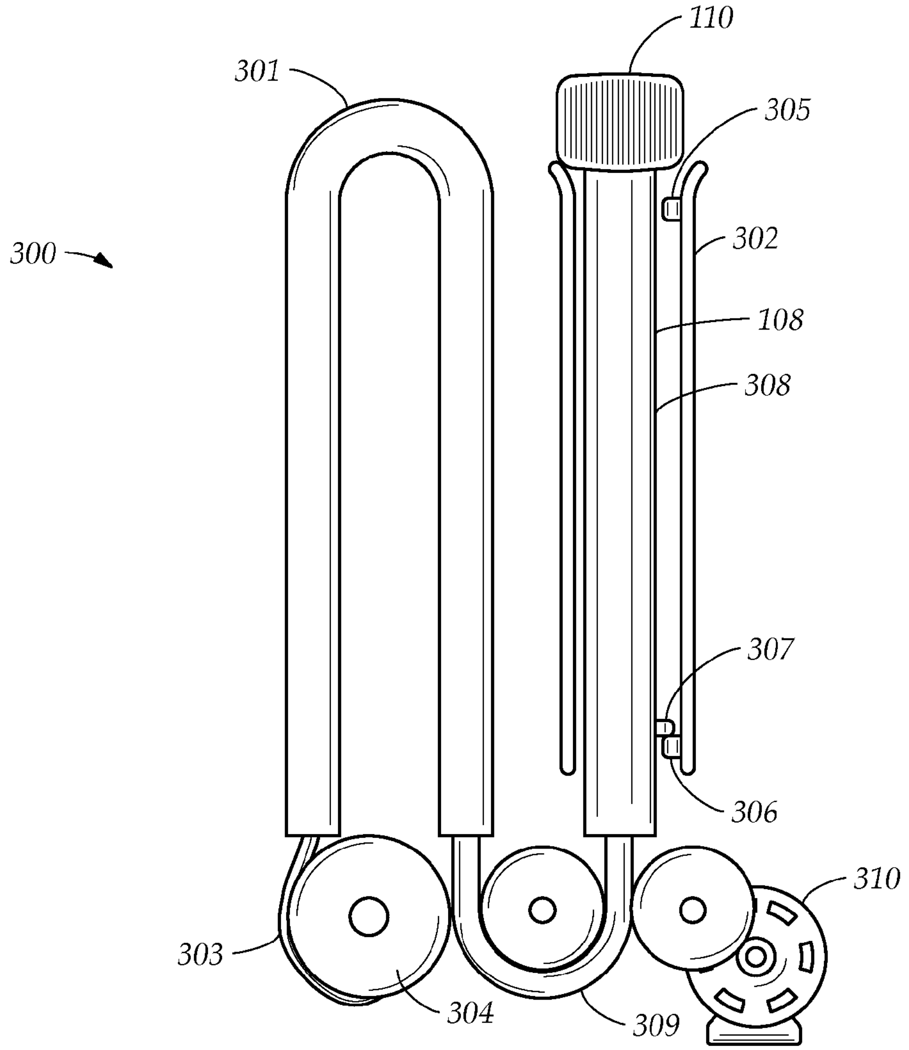
FIG. 5 shows an example embodiment of a mechanism for telescoping a mast where the mechanism is in a retraction state according to the present disclosure.

FIG. 5 shows an example embodiment of a mechanism for telescoping a mast where the mechanism is in a retraction state according to the present disclosure. Some elements of this figure are described above. Thus, same reference characters identify same or like components described above and any repetitive detailed description thereof will hereinafter be omitted or simplified in order to avoid complication.

A mechanism 300 for telescoping mast 107 includes a U-shaped pipe 301 and a sleeve 302. Alternatively, pipe 301 can have other shapes, such as V-shape, L-shape or I-shape or any other shape. Within sleeve 302 and protruding therefrom are a first stopper 305 and a second stopper 306 configured to limit a range of movement for portion 108. Stoppers 305 and 306 can be formed from sleeve 302 or be separately fabricated and connected to sleeve 302.

A push-pull tube 309 travels within pipe 301 and sleeve 302 via rotation of a plurality of wheels 304. Wheels 304 can be identical or different to each other. One of wheels 304 is a drive wheel driven by a motor 310. Tube 309 includes a wire 303 for conducting electric current for powering light 110. One of wheels 304 is a wire storage wheel for storing a roll of wire 303, which receives the electrical power from motor 310 or the engine. A tip of tube 309 is connected to a base of portion 108 for pushing and pulling portion 108.

Portion 108 has a third stopper 307 thereon. When retracted, portion 108 is housed within sleeve 302 and stoppers 306 and 307 are in contact with each other. Sleeve 302 is sized and dimensioned such that a height 308 of portion 108 fits within sleeve 302. Portion 109 is concentrically nested within portion 108.

Figure 6:
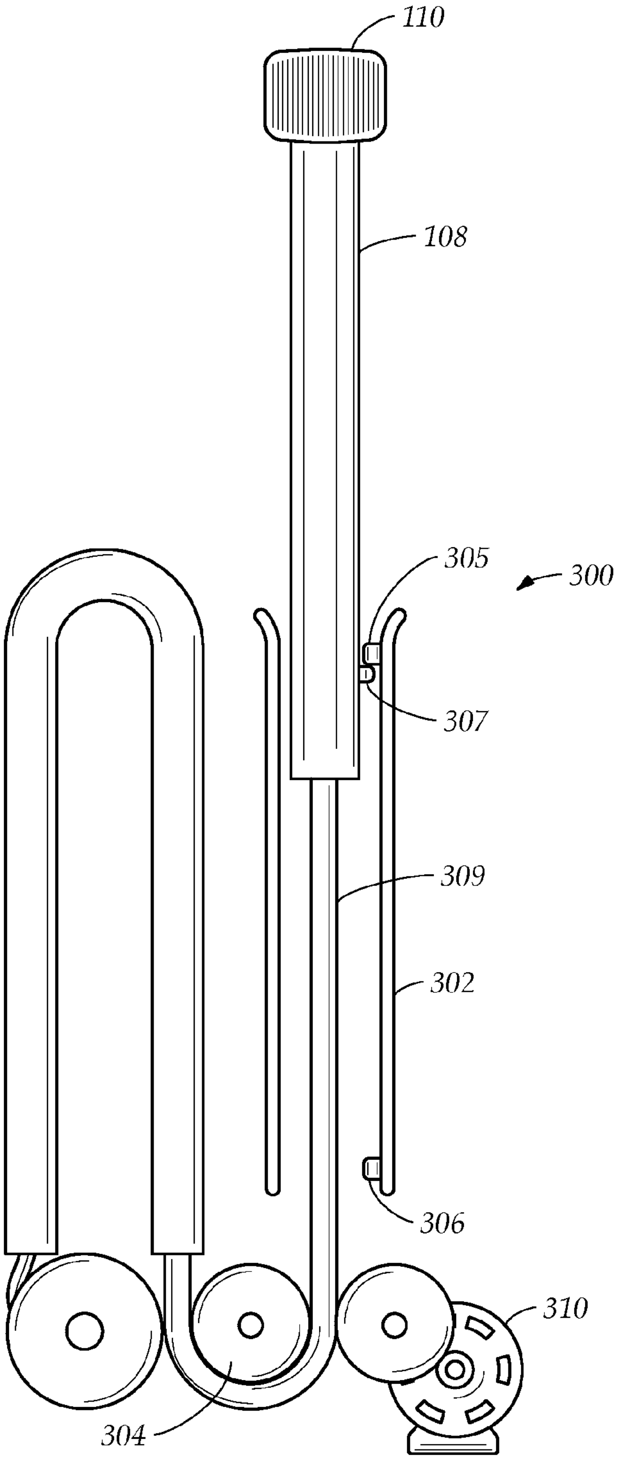
FIG. 6 shows an example embodiment of a mechanism for telescoping a mast where the mechanism is in a deployed state according to the present disclosure.

FIG. 6 shows an example embodiment of a mechanism for telescoping a mast where the mechanism is in a deployed state according to the present disclosure. Some elements of this figure are described above. Thus, same reference characters identify same or like components described above and any repetitive detailed description thereof will hereinafter be omitted or simplified in order to avoid complication.

When motor 310 is operating, tube 309 travels via wheels 304 through pipe 301 and sleeve 302. As a result, the tip of tube 309 applies pushing force to the base of portion 108. Hence, portion 108 moves from a retracted state, when stoppers 306 and 307 are in contact with each other, to a deployed state, when stoppers 305 and 307 are in contact with each other. Light 110 is thus elevated and powered via wire 303. Portion 109 can also telescopically elevate from portion 108, thus further elevating light 110.

Figure 7:
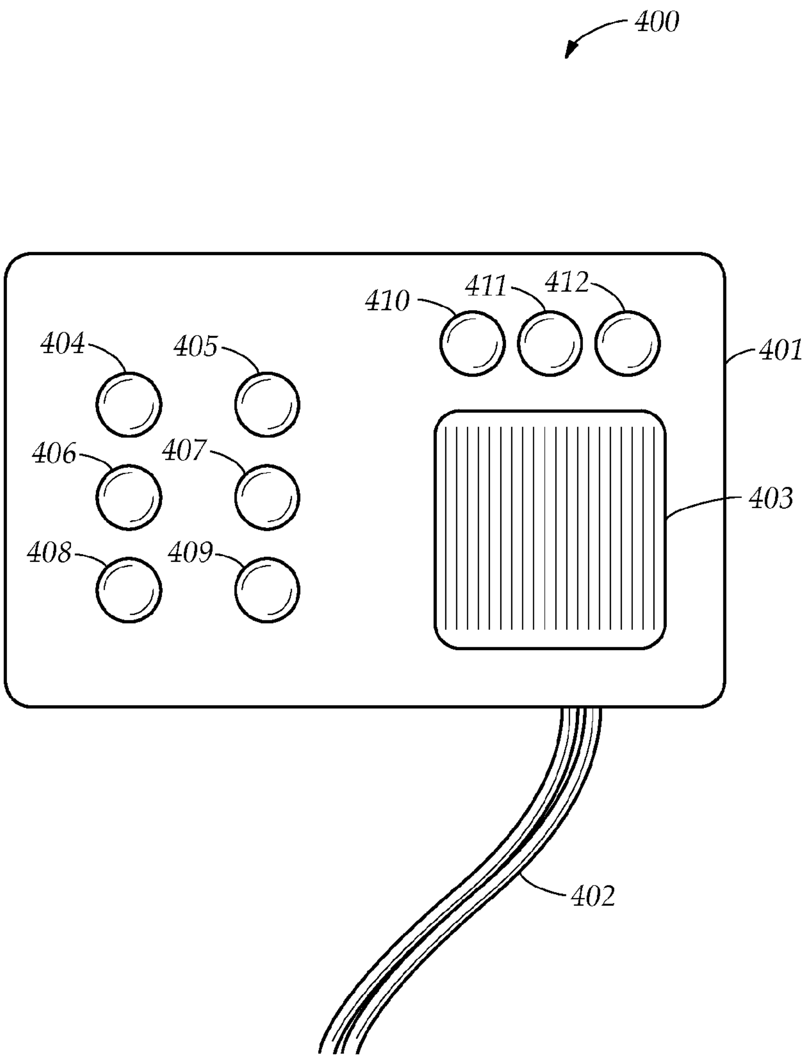
FIG. 7 shows an example embodiment of an outboard marine motor control console according to the present disclosure.

FIG. 7 shows an example embodiment of an outboard marine motor control console according to the present disclosure. Some elements of this figure are described above. Thus, same reference characters identify same or like components described above and any repetitive detailed description thereof will hereinafter be omitted or simplified in order to avoid complication.

A console 400 includes a housing 401 connected via a power cord 402 to a power means, such as a motor or a battery. Housing 401 can be of any shape, be waterproof and include metallic corrosion resistant or plastic material. Cord 402 is waterproof. Housing 401 includes a light 403, such as a courtesy light. Console 400 can be cowling 104. Console 400 can be not on motor 100 or 200, but within the boat, such as at the boat's control deck. Console 400 can wired or wirelessly operate to deploy and retract mast 807, turn on and off light 110, lights 111 and light 204.

Housing 401 includes a button 404 for deploying of mast 107, such as an up mast 107 button.

Housing 401 includes a button 405 for retracting of mast 107, such as a down mast 107 button.

Housing 401 includes a button 406 for turning on light 110, such as an on stern light button.

Housing 401 includes a button 407 for turning off light 110, such as an off stern light button.

Housing 401 includes a button 408 for turning on light 111, such as an on black light button.

Housing 401 includes a button 409 for turning off light 111, such as an off black light button.

Housing 401 includes a button 410 for changing color of light 110, such as a red light button.

Housing 401 includes a button 411 for changing color of light 110, such as a white light button.

Housing 401 includes a button 412 for setting a default mode for light 110, such as an off button.

Figure 8:
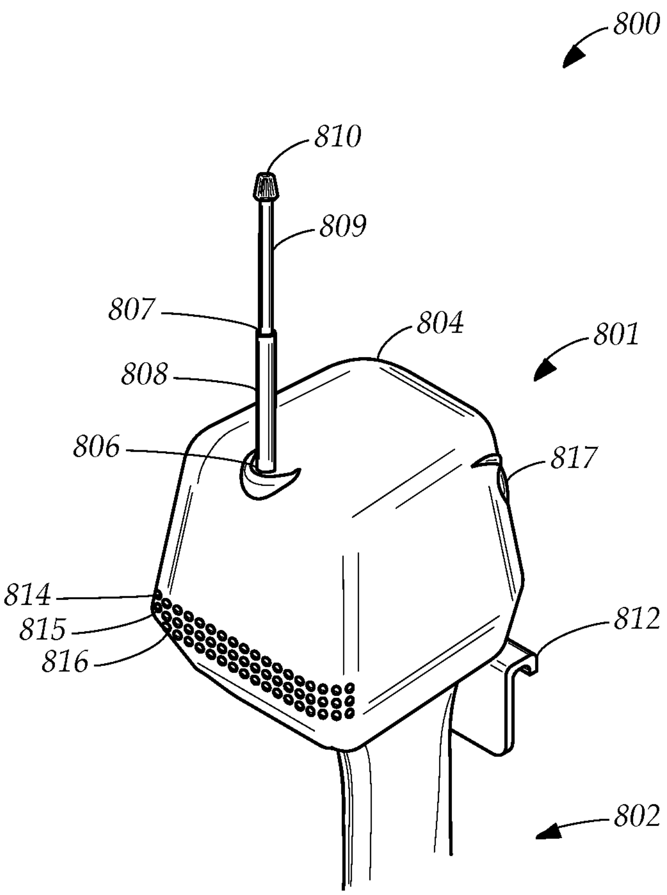
FIG. 8 shows an example embodiment of an outboard marine motor having a plurality of rear facing illumination patterns according to the present disclosure.

FIG. 8 shows an example embodiment of an outboard marine motor having a plurality of rear facing illumination patterns according to the present disclosure. Some elements of this figure are described above. Thus, same reference characters identify same or like components described above and any repetitive detailed description thereof will hereinafter be omitted or simplified in order to avoid complication.

A motor 800 includes an upper section 801 coupled to a middle section 802. Section 801 includes a cowling 804 having a mast aperture 806 through which a telescoping mast 807 is deployed into an interior space enclosed by cowling 804. Mast 807 includes a tubular portion 809 nested within a tubular portion 808. A stern navigation light source 810 is mounted onto a top end area of portion 809. Aperture 806 and mast 807 can function and/or be positioned as shown in FIG. 1-7.

Section also includes a first rear facing illumination pattern 814, a second rear facing illumination pattern 815 and a third rear facing illumination pattern 816. First pattern 814 is operative to selectively output a red light sufficiently bright to indicate the boat's presence to others during towing at nighttime. Second pattern 815 is operative to selectively output a white light sufficiently bright to illuminate overboard for nighttime visibility from inboard, such as for observing the caught fish as the fish is being reeled in. Third pattern 816 is operative to selectively output a black light sufficiently bright to illuminate overboard florescent fishing lines for nighttime visibility from inboard. The red light source can be above the black light source for greater visibility to others during towing. The black light is closer to the water for enhanced florescent fishing line illumination.

Patterns 814-816 are positioned to be above water level. Patterns 814-816 are linearly arranged, but other arrangements are possible as well, such as geometric shapes. Linear arrangement can be a straight line, a curved line, a wavy line, an angled line, a zigzag line and/or any other permutational combination thereof. Linear arrangement can be parallel, non-parallel and/or any other permutational combination thereof. Patterns 814-816 can be immediately adjacent to each other, non-immediately adjacent to each other, irrespective of present of other elements therebetween. Patterns 814-816 can be extending horizontally, diagonally, vertically and/or any other permutational combination thereof. Patterns 814-816 can extend on motor 800 rear side only, on the rear side extending over the corners and/or any other permutational combination thereof. Patterns 814-816 can extend fully along motor 800, such as along cowling 804, from a starboard side of motor 800 to a port side of motor 800. Motor 800 can have a bulging portion protruding from the rear side. Patterns 814-816 can have same or different degree of illumination. Patterns 814-816 can have same or different amount of light sources. Any section of patterns 814-816 can intersect with each other. Patterns 814-816 can have apertures of same or different sizes. Patterns 814-816 are controlled via a console for controlling mast 807, stern light source 810 and illumination from patterns 814-816.

Patterns 814-816 can include non-light features and/or elements as well. Patterns 814-816 can be protrusions, wells and/or any other defined areas. Patterns 814-816 can be rear facing to be directly opposite of the boat's bow and/or patterns 814-816 can be rear facing to be facing diagonally and/or vertically from the corners of the motor, if motor 800 has corners, such as at cowling 804. Patterns 814-816 can extend along the corners from both sides of converging sides of the corners. Patterns 814-816 can also be present on one side of the corners, such as the direct opposing from the bow side or the side converging with the direct opposing from the bow side. Patterns 814-816 can be enclosed by cowling 804 with cowling 804 having corresponding apertures such that patterns 814-816 are visible through the apertures, which can be covered by a plastic or a glass strip to prevent the water from coming in contact with patterns 814-816. Also, patterns 814-816 can be over cowling 104 such that patterns 814-816 are placed on top of cowling 804 with cowling 804 having corresponding holes for wiring from patterns 814-816. For example, patterns 814-816 can be belts over cowling 804. Patterns 814-816 can also be powered wirelessly via inductive charging.

Motor 800 can include a front facing inboard light source 817 operative to selectively output light sufficiently bright for illuminating inboard at nighttime. Mast 807 is above patterns 814-816 and inboard light source 817. The console can control inboard light source 817. Stern light source 810, inboard light source 817 and patterns 814-816 can output the lights based on light emitting diodes. Patterns 814-816 extend adjacently parallel to each other with first pattern 814 being above third pattern 816 with second pattern 815 therebetween. Light source 817 can be structured on motor 800 like patterns 814-816, such as with cowling 804 functioning as a frame with at least one aperture.

Patterns 814-816 can be connected to and powered by the power cord or the wire as described above or be connected to another power cord or another wire connected to the engine. Patterns 814-816 can individually or together be of any color, such as black ultraviolet (UV), white, red or green. For example, the red light can be above the white light which can be above the black light within each zone. Patterns 814-816 can individually or together be of any type of light bulb, such as an incandescent bulb, a fluorescent bulb or a LED bulb. Patterns 814-816 can be turned on and turned off individually or together. Patterns 814-816 can be used for fishing at night with a florescent fishing line. Wiring for patterns 814-816 is hidden within cowling 804. Cowling 804 can include patterns 814-816.

In another embodiment, motor 800 includes an outer wall with cowling 804 resting on the outer wall. The outer wall is operative to be above water level and the outer wall including patterns 814-816. Patterns 814-816 can be flush, non-flush with cowling 804, the outer wall and/or any permutational combination thereof.

Some example embodiments can allow mast 807 with light 810 to provide compact design, lack of hull integrity modification, less interference with boat occupants, aesthetic appearance, reduced water leakage, less wind resistance when retracted, enhanced visibility when telescoped, while allowing compliance with marine navigational rules, illumination of the boat's deck, on-board electrical systems powering lights 810 for extended periods of time and/or penalty reduction for boat operators due to incompliance with marine navigation rules. Also, the positioning of mast 807 makes putting away stern light 810 when not in use convenient and/or not burdensome to boat operators. Additionally, when mast 807 allows presence of valuable boat space and mast 807 can be difficult to brake, step on, lose or fall overboard due to its position.

Motor 800 can also include night sensor to function as disclosed herein. Motor 800 can also include GPS chip coupled to a weather receiver to function as disclosed herein.

Figure 9:
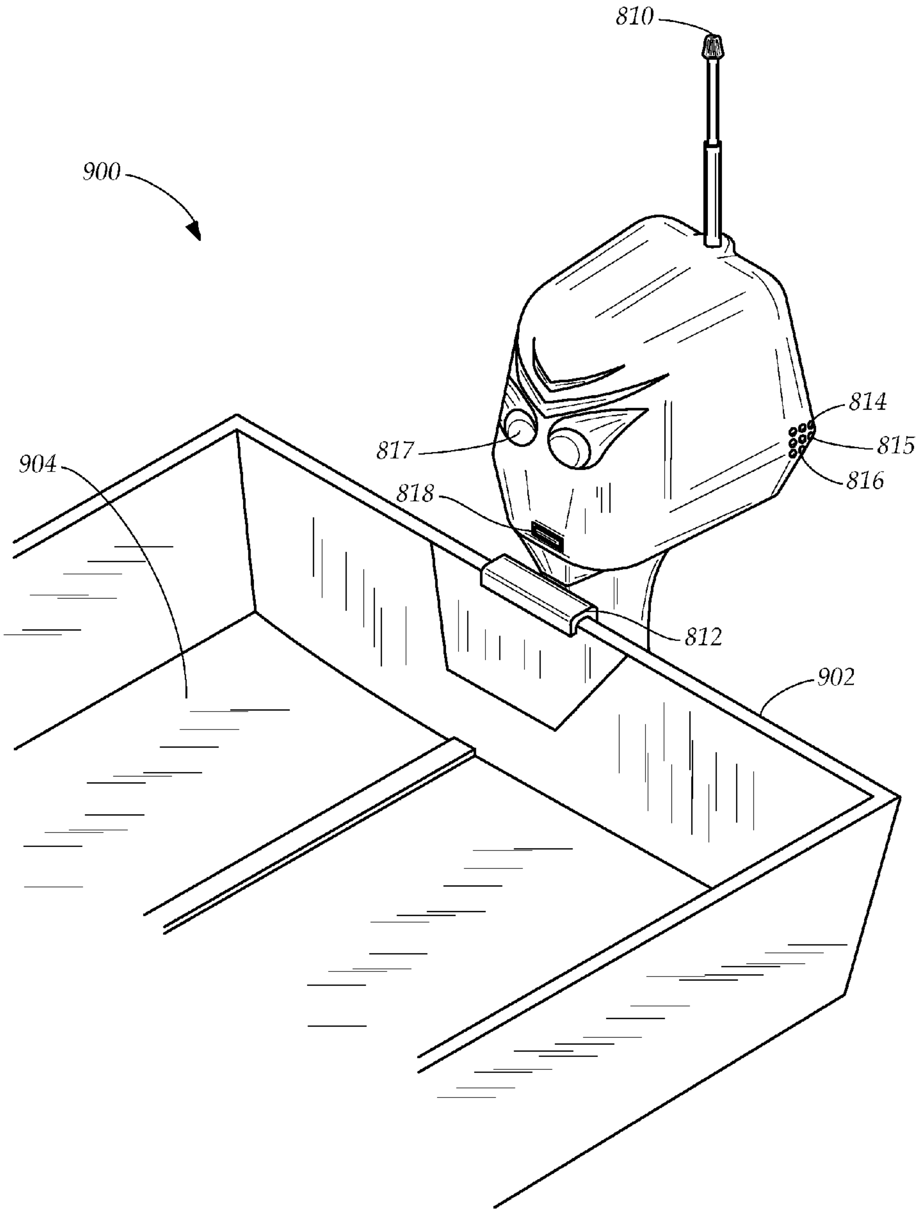
FIG. 9 shows an example embodiment of an outboard marine motor having a front facing inboard light source according to the present disclosure.

FIG. 9 shows an example embodiment of an outboard marine motor having a front facing inboard light source according to the present disclosure. Some elements of this figure are described above. Thus, same reference characters identify same or like components described above and any repetitive detailed description thereof will hereinafter be omitted or simplified in order to avoid complication.

A boat 900 includes a transom portion 902 adjacent to a stern deck portion 904. Motor 800 is secured onto portion 902 via a clamp 812, but other ways of securing motor 800 to portion 902 are possible, such as screws. Cowling 804 has an opening 818 for a latch to remove cowling 804 from motor 800 to gain access into interior space where the engine is located, such as for repairs for the engine, electrical system, light source 817, mast 807, light source 810 and/or patterns 814-816. Cowling 804 includes provision for light source 817, which can be arranged to look like an eye of a monster. Light source 817 can include at least one light source. Light 817 can have a plurality of light sources, such as a pair of light sources facing each other in order to provide enhanced portion 904 illumination. Light source 817 and/or stored light source 810 can be flush with cowling 804, non-flush with cowling 804.

Figure 10:
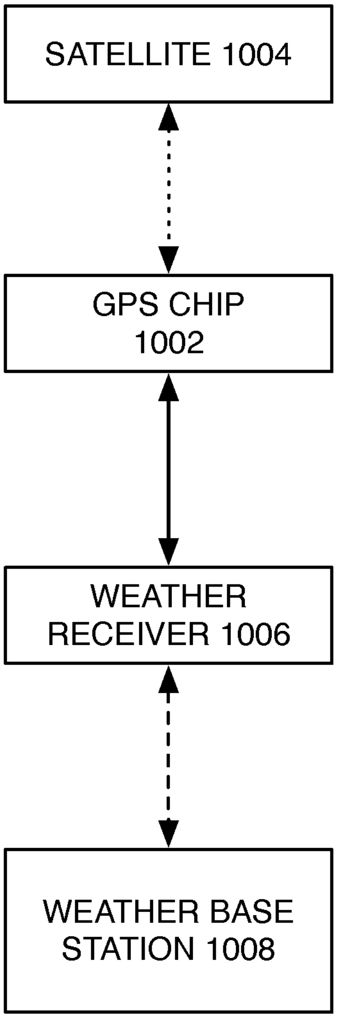
FIG. 10 shows an example embodiment of a geo-location receiver and a weather receiver according to the present disclosure.

FIG. 10 shows an example embodiment of a geo-location receiver and a weather receiver according to the present disclosure. Some elements of this figure are described above.

Thus, same reference characters identify same or like components described above and any repetitive detailed description thereof will hereinafter be omitted or simplified in order to avoid complication.

A GPS chip 1002 is in communication with a weather receiver 1006. Chip 1002 is in communication with a satellite 1004. Receiver 1006 is in communication with a weather base station 1008. Chip 1002 and/or receiver 1006 receive power generated via an engine of an outboard marine motor. Chip 1002 and/or receiver 1006 can be external and/or internal to a cowling of the outboard marine motor. Chip 1002 and/or receiver 1002 can be included in any portion of a telescoping mast as disclosed herein.

Figure 11:
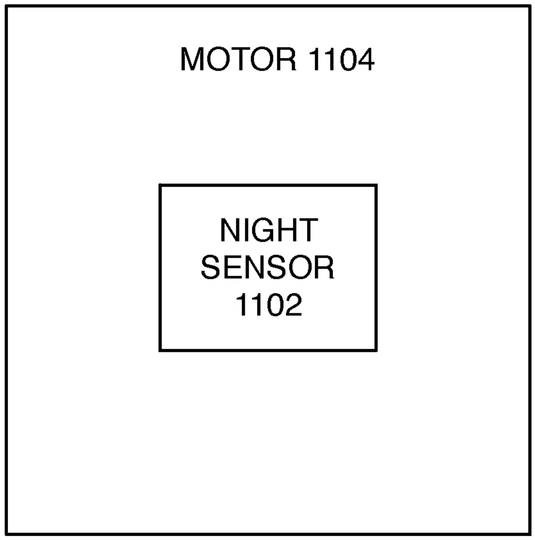
FIG. 11 shows an example embodiment of a night sensor according to the present disclosure.

FIG. 11 shows an example embodiment of a night sensor according to the present disclosure. Some elements of this figure are described above. Thus, same reference characters identify same or like components described above and any repetitive detailed description thereof will hereinafter be omitted or simplified in order to avoid complication.

An outboard marine motor 1104 includes a night sensor 1102, which can be receive power generated via an engine of outboard marine motor 1104. Sensor 1102 can be external and/or internal to a cowling of outboard marine motor 1104. Sensor 1102 can be included in any portion of a telescoping mast as disclosed herein.

In other example embodiments, any and/or all features and/or sub-features of any and/or all disclosed embodiments can be combined in any permutational combination thereof. For example, motor 100 can include front facing inboard light shaped as eyes or motor 800 can include channels 105 above patterns 814-816.

The description of the present disclosure has been presented for purposes of illustration and description, but is not intended to be fully exhaustive and/or limited to the disclosure in the form disclosed. Many modifications and variations in techniques and structures will be apparent to those of ordinary skill in the art without departing from the scope and spirit of the disclosure as set forth in the claims that follow. Accordingly, such modifications and variations are contemplated as being a part of the present disclosure. The scope of the present disclosure is defined by the claims, which includes known equivalents and unforeseeable equivalents at the time of filing of this application.

What is claimed is:

1. An outboard marine motor comprises:

a telescoping mast equipped with a stern navigation light source;

a weather receiver which receives location-based weather information; and a geo-location receiver operative for communication with the weather receiver, wherein the mast automatically telescopes and retracts, and the source automatically turns on and off based at least in part on the information.

2. The motor of claim 1, further comprises:

a night sensor which senses a night condition, the mast automatically telescopes and retracts, and the source automatically turns on and off based at least in part on the condition.

3. The motor of claim 1, further comprises:

a first rear-facing red light source disposed above water level, the first source extends between a starboard corner area of the motor and a port side corner area of the motor;

a second rear-facing black light source disposed above the water level, the second source extends between the starboard area and the port side area;

a third rear-facing white light source disposed above the water level, the third source extends between the starboard area and the port side area, wherein the first source, the second source, and the third source extend parallel to each other between the starboard area and the port side area.

4. The motor of claim 3, wherein the first source above the second source with the third source therebetween.

5. The motor of claim 1, further comprises:

a first rear-facing corner-based light source disposed above water level, the first source outputs a black light, a white light, and a red light; and a second rear-facing corner-based light source disposed above water level, the second source outputs a black light, a white light, and a red light, wherein the mast stationed between the first source and the second source.

6. The motor of claim 5, further comprises:

a front-facing inboard light source stationed between the first source and the second source;

a console which controls at least one of the first source, the second source, and the inboard source.

7. The motor of claim 5, wherein the first source illuminates a starboard corner area of the motor and the second source illuminates a port side corner area of the motor.

8. The motor of claim 5, wherein at least one of the first source and the second source includes a black light source, a white light source, and a red light source, the red light source disposed above the black light source with the white light source therebetween.

9. The motor of claim 5, further comprises:

an outer wall which includes the first source and the second source, the wall disposed above water level; and a cowling which rests on the outer wall.

10. The motor of claim 5, further comprises:

a cowling which includes the first source and the second source, the cowling disposed above water level.

11. A system for retrofitting an outboard marine motor, the motor includes an engine and a cowling which encloses the engine, the cowling disposed above water level, the system comprises:

a device comprising:

a telescoping mast including a stern navigation light source, a weather receiver which receives location-based weather information, a geo-location receiver operative for communication with the weather receiver, and a water-facing light source which outputs a black light, a white light, and a red light, wherein the mast automatically telescopes and retracts, and the stern source automatically turns on and off based at least in part on the information, and the device is configured for operably coupling to the cowling such that the mast, the stern source, the light source, and the receiver are powered via the engine; and a console which controls the light source.

12. The system of claim 11, wherein the device set for electrically coupling to an electrical wiring harness of the engine when the engine includes the harness such that the device is powered via the harness.

13. The system of claim 11, wherein the device secures to the cowling via at least one of an adhesive, a clamp, a pin, a fastener, a rivet, a male/female connector, a snap, a button, a belt, a hook, and a protrusion.

14. The system of claim 11, wherein the light source includes a black light source, a white light source, and a red light source, the red light source disposed above the black light source with the white light source therebetween.

15. The system of claim 11, further comprises:

a night sensor which senses a night condition, the device equipped with the sensor, the mast automatically telescopes and retracts, and the stern source automatically turns on and off based at least in part on the night condition.

* * * * *